United States Patent [19]

Jermyn, Jr.

[11] Patent Number: 5,588,188
[45] Date of Patent: Dec. 31, 1996

[54] SWAGED CABLE SWIVEL HOOK ASSEMBLY AND SWIVEL HOOK THEREFOR

[75] Inventor: Richard A. Jermyn, Jr., Panama City, Fla.

[73] Assignee: The United States of America as represented by the Secretary of the Navy, Washington, D.C.

[21] Appl. No.: 559,877

[22] Filed: Nov. 20, 1995

[51] Int. Cl.$^6$ .................................................. A44B 13/00
[52] U.S. Cl. ........................ 24/598.7; 24/600.7; 24/905; 294/82.17
[58] Field of Search .................... 24/598.7, 598.6, 24/598.5, 598.9, 598.8, 265 H, 905, 115 L, 136 L, 600.7; 294/82.17, 82.18, 82.19, 82.2, 82.21, 82.22, 82.23

[56] References Cited

U.S. PATENT DOCUMENTS

| | | | |
|---|---|---|---|
| 751,090 | 2/1904 | Marold | 24/265 H |
| 802,537 | 10/1905 | Uren | 294/82.17 |
| 1,523,765 | 1/1925 | Gilchrist | 294/82.23 |
| 3,177,543 | 4/1965 | Fountain | 24/115 L |
| 3,861,007 | 1/1975 | Silverman | 24/600.6 |

OTHER PUBLICATIONS

Catalog p. 251 entitled "Snap Shackles".

*Primary Examiner*—Victor N. Sakran

[57] ABSTRACT

A swaged cable swivel hook assembly includes a swivel hook and upper and lower swage elements for attachment to a portion of an elongated cable. The swivel hook includes an arcuate-shaped hook body defining a cavity and having a pair of upper and lower end portions spaced apart from one another and defining an opening through the hook body to the cavity. Upper and lower bores are respectively formed through the upper and lower end portions of the hook body for receiving a portion of the cable therethrough to provide a closure for crossing the opening through the hook body to the cavity. Upper and lower sockets are respectively formed in the upper and lower end portions of the hook body adjacent to the respective upper and lower bores. The upper swage element is attached to the cable portion at a first location thereon and is removably seatable within the upper socket to support the hook body on the cable. The lower swage element is attached to the cable portion at a second location thereon spaced below the first location and is removably seatable within the lower socket for respectively securing and releasing to and from the hook body the closure provided by the cable portion. The assembly also includes a releasable detent arrangement releasably securing the hook body to the upper swage element seated in the upper socket.

20 Claims, 2 Drawing Sheets

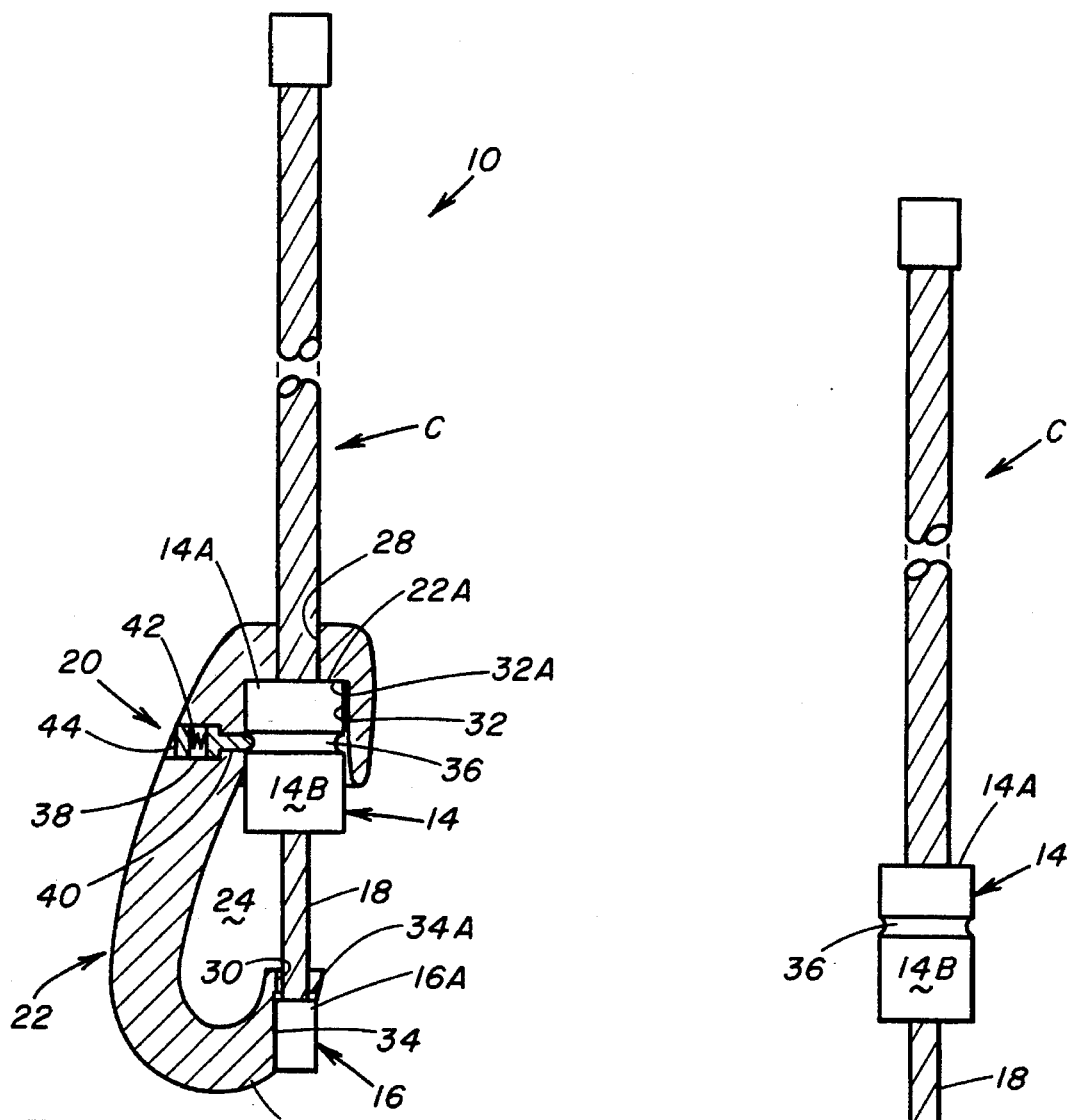
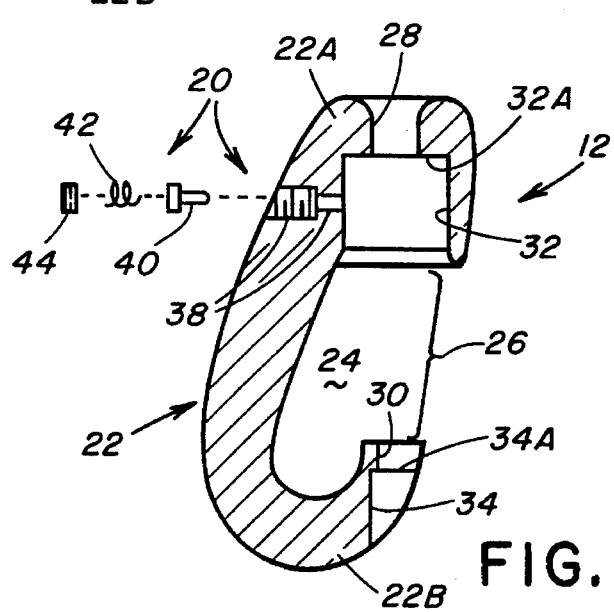

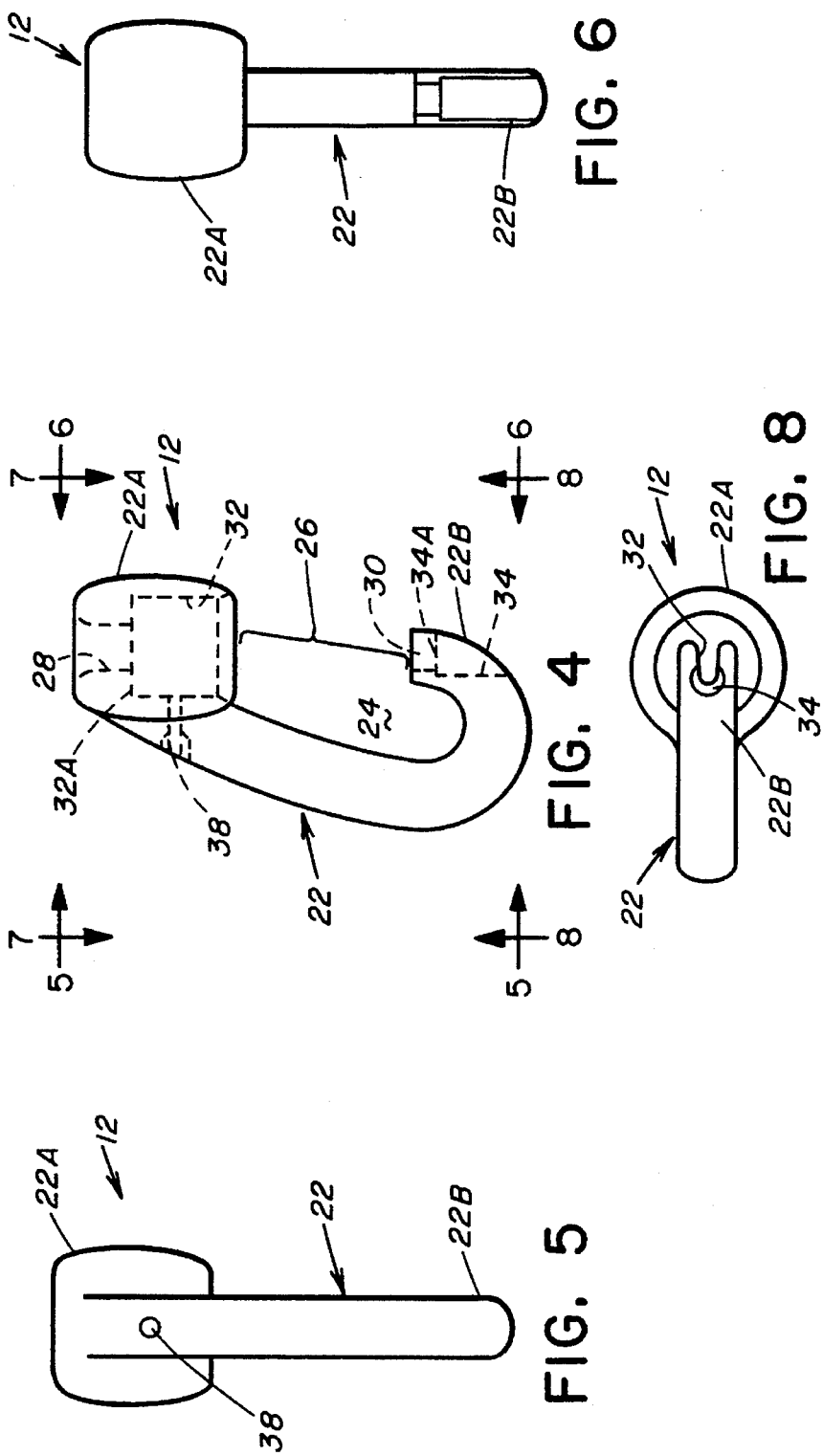

SWAGED CABLE SWIVEL HOOK ASSEMBLY AND SWIVEL HOOK THEREFOR

BACKGROUND OF THE INVENTION

1. Field of the Invention

The present invention generally relates to swivel-type hooks for securement to cables and the like for passing over rollers, drums and the like and, more particularly, is concerned with a swaged cable swivel hook assembly and swivel hook therefor.

2. Description of the Prior Art

Heretofore, swivel hooks attached to cables used in certain military applications, such as onboard U.S. Navy mine sweeping helicopters, have simply been commercially available types commonly used on modern pleasure sailing vessels. Such military applications contemplate that the cables and the swivel hooks attached thereto will be passed over and wound about rollers, drums, spools, sheaves and the like. These swivel hooks typically are attached to the cables by forming an eye in the cable, inserting it through the eye of the swivel part of the swivel hook and then passing the cable through the cable eye.

These swivel hooks as used heretofore in military applications have several drawbacks. First, they often break at the point where the swivel part of the swivel hook rotatably connects to the hook part of the swivel hook because the swivel and hook parts cannot withstand the cyclical bending which occurs when the swivel hook is forced over the rollers, drums, spools, sheaves and the like. Second, they typically have pins, rings or loops used to open and/or secure a latch part of the hook that will bend and thus become non-operational when high loads are imposed on the swivel hooks as they pass over rollers, drums, sheaves, spools and the like, or when high tension cables are wound over the swivel hooks as they are wound on a drum or spool.

Consequently, a need still exists for an improved design for a swivel hook which will overcome the drawbacks of the prior art without introducing new ones in their place.

SUMMARY OF THE INVENTION

The present invention provides a swivel hook and swaged cable swivel hook assembly designed to satisfy the aforementioned need. The swaged cable hook assembly of the present invention is particularly designed to be able to pass over rollers, drums, spools, sheaves and the like without damaging the swivel hook assembly, catching or snagging on other equipment, or sacrificing the capability of the swivel hook assembly to maintain a load safely secured to the cable.

Accordingly, the present invention is directed to a swaged cable swivel hook assembly which comprises a swivel hook having an arcuate-shaped hook body. The hook body defines a cavity and has a pair of upper and lower end portions spaced apart from one another and defining an opening through the hook body to the cavity along a side of the cavity. The hook body has upper and lower bores respectively defined through the upper and lower end portions of the hook body for receiving a portion of an elongated cable therethrough to provide a closure along the side of the cavity for crossing the opening through the hook body to the cavity. The hook body also has upper and lower sockets are respectively formed in the upper and lower end portions of the hook body adjacent to the respective upper and lower bores.

The swaged cable swivel hook assembly also comprises a pair of upper and lower swage elements for attachment to the portion of the elongated cable. The upper swage element is attached to the cable portion at a first location thereon and is removably seatable within the upper socket to support the hook body on the cable passing through the upper bore. The lower swage element is attached to the cable portion at a second location thereon spaced below the first location and is removably seatable within the lower socket for respectively securing and releasing to and from the hook body the closure provided by the cable portion passing through the upper and lower bores. The lower bore and lower socket are in the form of slots open along one side through which to slidably insert and remove the portion of the cable. Each of the upper and lower sockets include respective surfaces extending transverse to and at least partially surrounding the respective upper and lower bores to provide downwardly facing shoulders against which abuts upper ends of the respective upper and lower swage elements.

The swaged cable swivel hook assembly further includes a releasable detent arrangement releasably retaining the upper swage element seated in the upper socket of the hook body. The detent arrangement includes means defining an annular groove in an exterior sidewall of the upper swage element, a passage formed in the hook body opening adjacent to and aligned with the annular groove with the upper swage element seated in the upper socket, and a detent element mounted in the passage in the hook body and projecting therefrom into the annular groove so as to retain the upper swage element seated in the upper socket.

The swaged cable swivel hook assembly of the present invention, in addition to the aforementioned swivel hook and upper and lower swage elements, also comprises the portion of elongated cable extending through the upper and lower bores of the upper and lower end portions of the hook body and functioning as the closure for the opening of the swivel hook. The upper and lower swage elements are attached to the cable portion at the first and second locations thereon and are releasably seated within the upper and lower sockets in the upper and lower ends of the hook body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of a swaged cable swivel hook assembly of the present invention, showing a swivel hook of the assembly in longitudinal sectional form.

FIG. 2 is a side elevational view of a swaged cable of the assembly of FIG. 1 being shown by itself.

FIG. 3 is a longitudinal sectional view of a swivel hook and a releasable detent arrangement of the assembly of FIG. 1 being shown in exploded form.

FIG. 4 is side elevational view of the swivel hook of FIG. 3.

FIG. 5 is a front elevational view of the swivel hook as seen along line 5—5 of FIG. 4.

FIG. 6 is a rear elevational view of the swivel hook as seen along line 6—6 of FIG. 4.

FIG. 7 is a top plan view of the swivel hook as seen along line 7—7 of FIG. 4.

FIG. 8 is a bottom plan view of the swivel hook as seen along line 8—8 of FIG. 4.

DETAILED DESCRIPTION OF THE INVENTION

Referring to the drawings, and particularly to FIGS. 1 to 3, there is illustrated a swaged cable swivel hook assembly, generally designated 10, of the present invention. Basically, the swaged cable swivel hook assembly 10 includes a swivel hook 12 and a pair of upper and lower swage elements 14, 16 for attachment to a portion 18 of an elongated cable C. The assembly 10 also includes a releasable detent arrangement 20 releasably connecting the hook body 22 to the upper swage element 14 when attached to the cable portion 18. The swivel hook 12, the upper and lower swage elements 14, 16, and the releasable detent arrangement 20 are illustrated in an assembled form with the cable portion 18 in FIG. 1.

Referring to FIGS. 1 and 3–8, there is illustrated the swivel hook 12 of the assembly 10. The swivel hook 12 basically includes an arcuate-shaped hook body 22 defining an eye or cavity 24 and having a pair of upper and lower end portions 22A, 22B spaced apart from one another and defining an opening 26 through the hook body 22 to the cavity 24 along a side of the cavity 24. The hook body 22 has upper and lower bores 28, 30 respectively defined through the upper and lower end portions 22A, 22B of the hook body 22 in alignment with one another for receiving the portion 18 of the cable C therethrough, as shown in FIG. 1, to provide a closure along the side of the cavity 24 which crosses the opening 26 through the hook body 22 to the cavity 24. The hook body 22 also has upper and lower sockets 32, 34 respectively formed in the upper and lower end portions 22A, 22B of the hook body 22 adjacent to the respective upper and lower bores 28, 30.

Referring to FIGS. 1 and 2, the upper and lower swage elements 14, 16 of the assembly 10, in any suitable conventional manner and by any suitable conventional means, are respectively attached to the portion 18 of the elongated cable C. The upper swage element 14 is attached to the cable portion 18 at a first location thereon and is removably seated and thus locked within the upper socket 32 to support the hook body 22 on the portion 18 of the cable C passing through the upper bore 28. The lower swage element 16 is attached to the cable portion 18 at a second location thereon spaced below the first location and is removably seated and thus locked within the lower socket 34 for respectively securing and releasing to and from the hook body 22 the closure provided by the cable portion 18 passing through the upper and lower bores 28, 30. As one example, the upper bore 28 is cylindrical in configuration for receiving the upper swage element 14 which is also cylindrical in configuration. As best seen in FIG. 8, the lower bore 30 and lower socket 34 are in the form of slots which open along one side through which to slidably insert and remove the portion 18 of the cable C into and from the swivel hook 12. Also, the upper and lower sockets 32, 34 include respective flat surfaces 32A, 34A extending transverse to and at least partially surrounding the respective upper and lower bores 28, 30 to provide downwardly facing shoulders against which abuts upper ends 14A, 16A of the respective upper and lower swage elements 14, 16 when seated and locked within the respective upper and lower sockets 32, 34. The lower swage element 16 may be removed (or replaced) from the lower socket 34 by raising the swivel hook 12 vertically along and with respect to the swaged cable C and then passing the portion 18 of the cable C outward (or inward) through the slots defining the lower bore 30 and lower socket 34 of the swivel hook 12.

Referring to FIGS. 1–5, the releasable detent arrangement 20 releasably retains the upper swage element 14 seated and thus locked within the upper socket 32 of the hook body 22. The detent arrangement 20 includes an annular groove 36 formed in the exterior sidewall 14B of the upper swage element 14, a passage 38 formed in the hook body 22 which opens adjacent to and aligned with the annular groove 36 in the upper swage element 14 with the latter seated in the upper socket 32, and a detent element 40 mounted in the passage 40 in the hook body 22 and projecting therefrom into the annular groove 36 so as to retain the upper swage element 14 seated in the upper socket 32. The detent arrangement 20 also includes a spring 42, having any suitable form such as a coiled configuration, disposed in the passage 38 and engaging and biasing the detent element 40 to slidably move toward a locking position relative to the groove 36 in the upper swage element 14. Also, the spring 42 is yieldable to allow retraction of the detent element 40 into the passage 38 to an unlocking position relative to the groove 36 so as to permit movement of the hook body 22 relative to the upper swage element 14 on the portion 18 of the cable C. Also, a set screw 44 can be threaded into or from the passage 38 to preset the level of force below which the spring 42 will resist retraction of the detent element 40 into the passage 38 so as to prevent the swivel hook 12 from being moved relative to the upper swage element 14. Thus, to produce such relative movement, the force applied upward on the swivel hook 12 must exceed the preset level of force. At the same time, since all swage elements 14, 16, sockets 32, 34 and the cable C are of sufficient dimensions to provide adequate clearance therebetween, the swivel hook 12 is free to swivel freely about the swaged cable C on the condition that sufficient torque is available.

The advantages and features of the swaged cable swivel hook assembly 10 of the present invention are as follows (but not necessarily in order of importance). First, the assembly 10 can be provided in a compact size with relatively smooth outside dimensions. Second, the portion 18 of the cable C extending between end portions of the swivel hook 14 is also used to close the eye or cavity 24 of the hook 12 which provides a simple and strong construction. Third, the lower portion of the cable C and the lower swage element 16 may be sized to provide additional support to the portion of the swivel hook 12 supporting a load and thus prevent the hook 12 from opening due to yield stress. Fourth, the lower portion of the cable C may be angled slightly from the line of the upper portion of the cable C or upper swage element 14 such that the internal bending stress of the lower portion of the cable C would tend to self-close the mouth or opening 26 to the cavity 24 of the hook 12. Fifth, since the swaged cable C must be moved downward relative to the swivel hook 12 in order to release the load from the hook 12, there is an automatic tendency for the upper swage element 14 to interfere with the load itself which automatically retains the load supported by the hook 12 and, also, the internal stress of the lower portion of the cable C automatically increases, as mentioned above, which further assists in retaining the load. And, sixth, it is possible to size the dimensions of the swivel hook 12, cable C and swage elements 14, 16 in relationship to the dimensional size of the intended load such that both upper and lower swage elements 14, 16 must be withdrawn totally from the hook 12 in order for the load to be physically withdrawn from the hook 12 and thus further increasing the probability that the load will not be inadvertently released.

The following stipulations and/or modifications are applicable to the illustrated and described embodiment of the swaged cable swivel hook assembly 10 of the present invention. First, the term "cable" should be considered to refer to any flexible wire, rod, chain or flexible assembly of linkages which perform the same or similar task as described heretofore. Second, the assembly 10 can be made from any suitable material which is available to perform the intended function. Such material may be metal, alloys, synthetics or composites, etc. Third, there are other means similar to the example given above of the releaseable detent arrangement 20 to additionally prevent the hook from opening such as using a similar device on the lower swage element 16 (or portion of the cable itself) or by using any screw, pin, hasp, lock, cap, snap or any other locking device to perform this same function. Fourth, additional hooks or other devices can be serially connected to the lower portion of the cable (such as below the upper swage element or below the lower swage element) so that multiple swivel hooks or swivel devices can provide more than one point of attachment to the elongated cable C.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A swivel hook, comprising:

(a) an arcuate-shaped hook body defining a cavity and having a pair of upper and lower end portions spaced apart from one another along a side of said cavity and defining an opening through said hook body to said cavity along said side thereof;

(b) means defining an upper bore through said upper end portion of said hook body and a lower bore through said lower end portion of said hook body, said upper and lower bores for receiving a portion of a cable therethrough to provide a closure along said side of said cavity for crossing said opening through said hook body to said cavity; and (c) means forming upper and lower sockets in said upper and lower end portions of said hook body respectively adjacent to said upper and lower bores for receiving and seating respective upper and lower swage elements attached to the portion of the cable received through said upper and lower bores.

2. The assembly of claim 1 further comprising:

(d) a releasable detent arrangement for releasably retaining the upper swage element seated in said upper socket of said hook body.

3. The assembly of claim 2 wherein said detent arrangement includes:

a passage formed in said hook body opening adjacent to and aligned with an annular groove in the upper swage element with the upper swage element seated in said upper socket; and a detent element mounted in said passage in said hook body and projecting therefrom into the annular groove so as to retain the upper swage element seated in said upper socket.

4. The assembly of claim 3 wherein said detent arrangement also includes a spring disposed in said passage and engaging and biasing said detent element toward the upper swage element and being yieldable to allow retraction of said detent element into said passage to permit removal of the upper swage element from said upper socket in said hook body.

5. A swaged swivel hook assembly for attachment to an elongated cable, said assembly comprising:

(a) a swivel hook including
      (i) an arcuate-shaped hook body defining a cavity and having a pair of upper and lower end portions spaced apart from one another and defining an opening through said hook body to said cavity,
      (ii) means defining an upper bore through said upper end portion of said hook body,
      (iii) means defining a lower bore through said lower end portion of said hook body, said upper and lower bores for receiving a portion of an elongated cable to provide a closure of said opening through said hook body to said cavity,
      (iv) means forming an upper socket in said upper end portion of said hook body adjacent to said upper bore therethrough, and
      (v) means forming a lower socket in said lower end portion of said hook body adjacent to said lower bore therethrough;

(b) an upper swage element for attachment to the portion of the elongated cable at a first location thereon and being removably seatable within said upper socket in said upper end portion of said hook body for supporting said hook body on the elongated cable; and (c) a lower swage element for attachment to the portion of the elongated cable at a second location thereon spaced below the first location thereon and being removably seatable within said lower socket in said lower end portion of said hook body for securing to and releasing from said hook body the closure provided by the portion of the cable extending through said upper and lower bores of said hook body.

6. The assembly of claim 5 wherein said upper bore is cylindrical in configuration for receiving said upper swage element which is also cylindrical in configuration.

7. The assembly of claim 5 wherein said lower bore is in the form of a slot open along one side through which to slidably insert and remove the portion of the cable.

8. The assembly of claim 5 wherein said upper and lower sockets include respective surfaces extending transverse to and at least partially surrounding respectively said upper and lower bores to provide downwardly facing shoulders against which to abut upper ends of said respective upper and lower swage elements.

9. The assembly of claim 5 further comprising:

(d) a releasable detent arrangement for releasably retaining said upper swage element seated in said upper socket of said hook body.

10. The assembly of claim 9 wherein said detent arrangement includes an annular groove formed in an exterior sidewall of said upper swage element.

11. The assembly of claim 10 wherein said detent arrangement includes:

a passage formed in said hook body opening adjacent to and aligned with said annular groove in said upper swage element with said upper swage element seated in said upper socket; and a detent element mounted in said passage in said hook body and projecting therefrom into said annular groove so as to retain said upper swage element seated in said upper socket.

12. The assembly of claim 11 wherein said detent arrangement also includes a spring disposed in said passage and engaging and biasing said detent element toward said upper swage element and being yieldable to allow retraction of said detent element into said passage to permit removal of said upper swage element from said upper socket in said hook body.

13. A swaged cable swivel hook assembly, comprising:
   (a) a swivel hook including
      (i) an arcuate-shaped hook body defining a cavity and a pair of upper and lower opposite end portions spaced apart from one another and defining an opening through said hook body to said cavity,
      (ii) means defining an upper bore through said upper end portion of said hook body,
      (iii) means defining a lower bore through said lower end portion of said hook body,
      (iv) means defining an upper socket in said upper end portion of said hook body adjacent to said upper bore therethrough, and
      (v) means defining a lower socket in said lower end portion of said hook body adjacent to said lower bore therethrough;
   (b) a portion of an elongated cable adapted to extend through said upper and lower bores of said upper and lower end portions of said hook body;
   (c) an upper swage element attached to said portion of the cable at a first location thereon and being removably seatable within said upper socket in said upper end portion of said hook body; and
   (d) a lower swage element attached to said portion of said cable at a second location thereon being spaced below said upper swage element at the first location and being removably seatable within said lower socket in said lower end portion of said hook body.

14. The assembly of claim 13 wherein said upper bore is cylindrical in configuration for receiving said upper swage element which is also cylindrical in configuration.

15. The assembly of claim 13 wherein said lower bore is in the form of a slot open along one side through which to slidably insert and remove said portion of said cable.

16. The assembly of claim 13 wherein said upper and lower sockets include respective surfaces extending transverse to and at least partially surrounding respectively said upper and lower bores to provide downwardly facing shoulders against which to abut upper ends of said respective upper and lower swage elements.

17. The assembly of claim 13 further comprising:
   (d) a releasable detent arrangement for releasably retaining said upper swage element seated in said upper socket of said hook body.

18. The assembly of claim 17 wherein said detent arrangement includes an annular groove formed in an exterior sidewall of said upper swage element.

19. The assembly of claim 18 wherein said detent arrangement further includes:
   a passage formed in said hook body opening adjacent to and aligned with said annular groove in said upper swage element with said upper swage element seated in said upper socket; and
   a detent element mounted in said passage in said hook body and projecting therefrom into said annular groove so as to retain said upper swage element seated in said upper socket.

20. The assembly of claim 19 wherein said detent arrangement also includes a spring disposed in said passage and engaging and biasing said detent element toward the upper swage element and being yieldable to allow retraction of said detent element into said passage to permit removal of said upper swage element from said upper socket in said hook body.

* * * * *